Dec. 24, 1940.  C. A. BREWER  2,225,682
CONTROL MECHANISM
Filed May 11, 1934  2 Sheets-Sheet 2
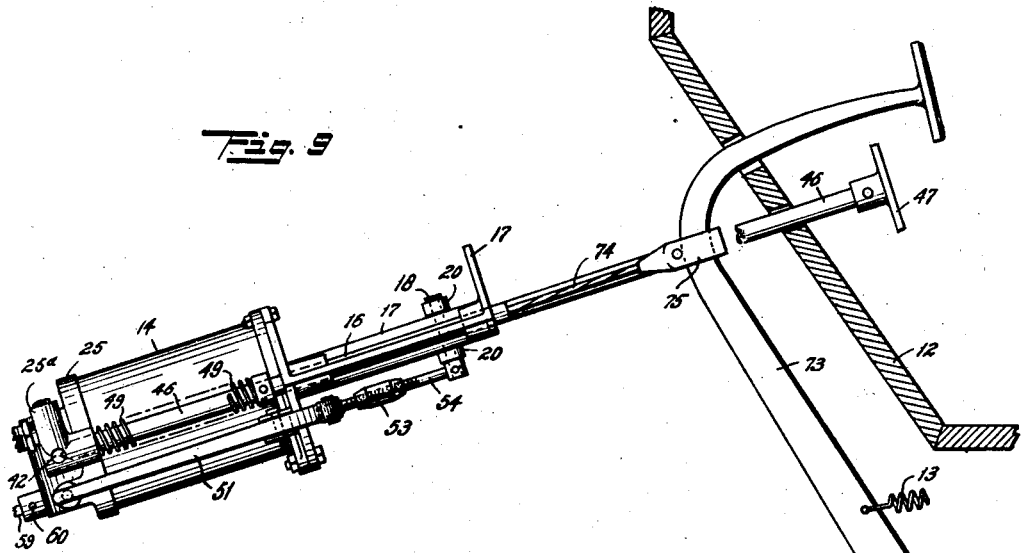
INVENTOR
Charles A. Brewer.
BY McConkey & Smith
ATTORNEY Patented Dec. 24, 1940

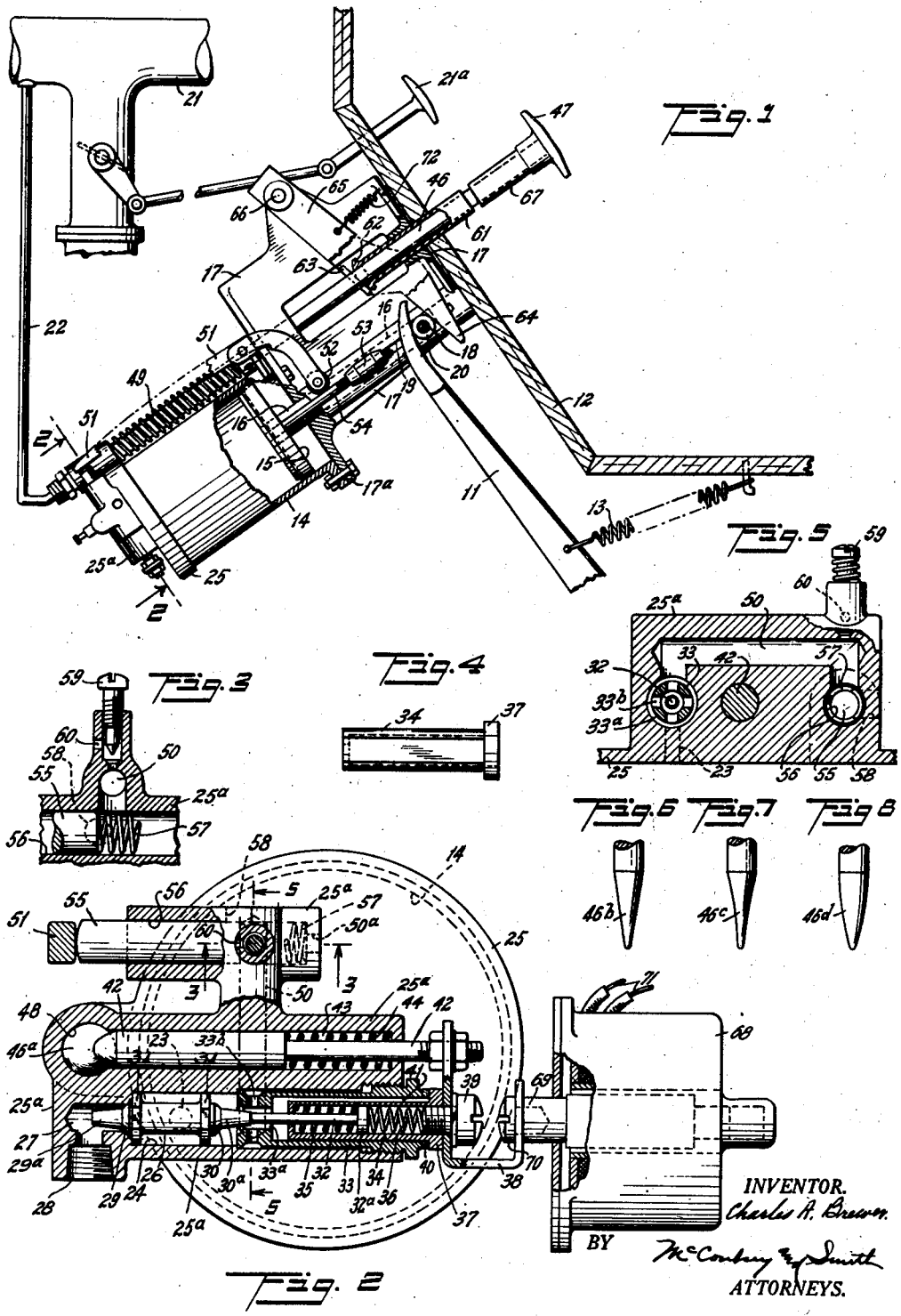

2,225,682

UNITED STATES PATENT OFFICE 2,225,682

CONTROL MECHANISM

Charles A. Brewer, Noroton Heights, Conn., assignor of one-half to Philip J. Kury, Arverne, N. Y.

REISSUED MAR 7 1944

Application May 11, 1934, Serial No. 725,167

14 Claims. (Cl. 192—91)

This invention relates to clutch control mechanism, and more particularly to fluid pressure power means for actuating and controlling the clutch of an automotive vehicle.

One of the objects of the present invention is to provide novel power and/or manually operated means for disengaging and engaging the friction surfaces of a clutch, said means being so constructed that engagement of said surfaces may be controlled in a manner to simulate expert manual operation of the clutch.

Another object of the invention is to provide novel vacuum clutch control means which are so constructed as to facilitate manual operation of the clutch in the event of a failure of the power elements of said control means.

Another object is to provide novel control means for the power clutch actuating apparatus, whereby the movement of the clutch surfaces by said apparatus may be manually controlled to secure any desired movement of the clutch surfaces.

A further object is to provide power clutch control mechanism of the type wherein the clutch surfaces are moved toward and into engagement at a varying rate of speed, said mechanism embodying novel means for rendering the automatic control of the engaging movement ineffective, whereby said engaging movement may be accelerated or retarded at the will of the operator.

Another object is to provide novel valve mechanism for initiating the disengaging and engaging movement of the clutch parts, said valve mechanism being adapted to be actuated either manually or by power means.

The above and other objects and advantages of the invention will appear more fully hereafter in the detailed description which is to be read in connection with the accompanying drawings. It will be understood, however, that said drawings are for purposes of illustration only and are not designed as a definition of the limits of the invention, reference being had for this purpose to the appended claims. In the drawings, Fig. 1 is a side elevation, partly in section and with parts broken away, illustrating one embodiment of the present invention;

Fig. 2 is a sectional view taken substantially on line 2—2 of Fig. 1, a portion of the mechanism being shown in elevation and with an electrical control device attached thereto;

Fig. 3 is a sectional detail taken on the line 3—3 of Fig. 2;

Fig. 4 is a top plan view illustrating one element of the control mechanism;

Fig. 5 is a sectional detail view taken substantially on the line 5—5 of Fig. 2;

Figs. 6, 7 and 8 are detail views showing various shapes that may be given to a portion of one of the control members;

Fig. 9 is a side elevation, with parts broken away, of a second embodiment of the invention, the power unit per se being similar to that shown in Fig. 1; and Fig. 10 is a top plan view of a third embodiment of the invention.

Referring to the embodiment of the invention illustrated in Fig. 1, 11 is a portion of a lever operatively associated with a vehicle clutch (not shown) of any suitable type. As is understood in the art, pivotal movement of lever 11 in an anti-clockwise direction is effective to move the friction surfaces of the clutch to disengaged, or inoperative, position. Lever 11 is pivotally mounted beneath the floor boards 12 of the vehicle and is normally maintained in the clutch engaged position illustrated by means of a clutch spring (not shown) adapted to normally maintain the friction surfaces of the clutch in driving engagement. As shown, an additional spring 13, secured to lever 11 and floor boards 12, may be provided to yieldingly hold the upper end of said lever in operative engagement with the power device and its control mechanism, to be described hereafter, and to hold the lower end of said lever in such a position to relieve wear of the clutch trunnion bearing.

The power unit for actuating the clutch lever is of the vacuum type, in the form shown, and comprises a cylinder 14 (Figs. 1, 9 and 10) having therein a piston 15 attached to a piston rod 16 which is guided in its reciprocating movement by means of a cylinder mounting bracket 17 secured in any suitable manner below and closely adjacent the floor boards 12. Extending transversely through the outer end of piston rod 16 is a pin 18 adapted to move in a groove 19 (Figs. 1 and 10) provided in bracket 17. Rollers 20 (Figs. 1 and 9) are mounted on the opposite ends of pin 18, and, preferably, lever 11 is bifurcated to engage the two rollers on the opposite sides of bracket 17. It will thus be seen that movement of piston 15 to the left and downwardly, as viewed in Fig. 1, will result in rollers 18 moving lever 11 in an anti-clockwise direction, whereby the friction surfaces of the clutch will be disengaged.

The power cylinder 14 is operatively connected to a suitable source of fluid power, such as the intake manifold 21 of an internal combustion engine (not shown), a pipe 22 being employed as the connection between said cylinder and manifold. When air is exhausted from the lower left-hand end of cylinder 14 through vacuum connection 22, it will be apparent that piston 15 and piston rod 16 will be moved downwardly to actuate lever 11 and disengage the friction elements of the clutch.

Novel valve means are provided for controlling the vacuum connection to cylinder 14. To this end, the cylinder head 25 at the lower end of said cylinder is provided with an opening or passage 23 (Fig. 2) which leads from the interior of the cylinder to a cylindrical passage 24 formed in an enlarged and projecting portion 25a of said cylinder head. Slidably mounted within passage 24 is a valve member 26 adapted to control a vacuum passage 27, the walls of the outer end of the latter being threaded as at 28 to receive the pipe 22. Member 26 carries a conical valve 29 adjacent one end thereof, adapted to close passage 27, and a valve 30 adjacent the opposite end. Flanges 31, having segments cut from the peripheries thereof, are integral with member 26 and serve to guide the latter during its movement in passage 24. The right-hand end of valve member 26, as viewed in Fig. 2, is provided with a rod 32 which extends into a sleeve 33 threaded into the walls of passage 24. The left-hand end of sleeve 33 is provided with a seat for valve 30 whereby the latter is adapted to close an air passage 33a formed in the left-hand end of said sleeve.

Novel means are provided for connecting valve member 26 to operating means therefor, the connecting means being such as to permit relative movement between valve member 26 and its operating means, whereby control of said valve member is subject in part to vacuum and atmospheric pressures and in part to manual operation. As shown, said connecting means are constituted by a barrel 34 slidably mounted within sleeve 33, the inner walls of said barrel serving as a guide for the enlarged head 32a of rod 32. A spring 35 is positioned in the left-hand end of barrel 34 to yieldingly resist relative movement between said barrel and said rod in one direction, relative movement in the other direction being resisted by means of a spring 36 positioned in the right-hand end of the barrel. The outer end of barrel 34 carries a flange 37, constituting a valve, which is held in engagement with a U-shaped member 38 by means of a screw 39 extending into the right-hand, threaded end of the barrel. Preferably, a sealing ring 40 is interposed between valve 37 and the adjacent end of sleeve 33 in order to control the flow of air through a passage 41 provided between the outer wall of the barrel and the inner wall of said sleeve. As shown in Fig. 4, a segment is cut from the outer surface of barrel 34 to provide the air passage 41.

Adjustably secured to U-shaped member 38, adjacent barrel 34, is a push rod 42 that is slidably mounted in a cylindrical passage 43 formed in cylinder head portion 25a and extending parallel to passage 24. A spring 44, positioned in passage 43 and surrounding a reduced portion of rod 42, is normally effective through U-shaped member 38 to retain valve 37 in engagement with sealing ring 40, closing air passage 41. Barrel 34 is thus yieldingly held in such a position that springs 35 and 36 maintain valve 29 on its seat, whereby the vacuum connection between cylinder 14 and the intake manifold of the engine is closed. The vacuum in passage 27 also acts to retain valve 29 on its seat.

Manual means are provided for moving rod 42 to the right, as viewed in Fig. 2, whereby valve 29 is moved from its seat and the vacuum in the intake manifold is effective through passage 27, passage 24, and opening 23 to exhaust the air from cylinder 14 and move piston 15 downwardly to disengage the clutch plates, it being noted that the upper face of said piston is always subjected to atmospheric pressure through a suitable opening in the upper cylinder head. After valve 29 is opened, valve 30 is moved onto its seat, whereby the flow of air through passage 33a is prevented. As shown, the manual means for actuating rod 42 comprises a slidably mounted rod 46 (Figs. 1, 2, 9 and 10) which extends through a suitable opening in floor boards 12 in the position occupied by the usual clutch pedal, the use of the latter being rendered unnecessary by the present invention. The upper end of rod 46 is provided with a footpad 47 while the lower end extends through an opening 48 (Fig. 2) in the raised portion 25a of cylinder head 25, the intermediate portion of the rod being guided by bracket 17.

As shown more clearly in Figs. 2, 6, 7 and 8, the lower end of rod 46 is tapered as at 46a, 46b, 46c or 46d, the tapered portion being adapted to engage rod 42 and move the same, at a variable rate, to the right against the tension of spring 44. A coil spring 49 (Figs. 1 and 9) normally maintains rod 46 in raised position whereby the rods and valve member 26 occupy the position shown in Fig. 2. When rod 46 is moved downwardly, under foot pressure applied to pad 47, a sufficient distance for the cylindrical portion thereof to engage rod 42, the latter is effective through member 38, its associated elements and yielding connection 35 to open valve 29 and seat valve 30, whereupon the power unit operates to fully disengage the clutch. The only effort required by the driver to disengage the clutch is that employed in depressing rod 46 a short distance against the tension of springs 44 and 49 and the fluid pressures acting on valve member 26. When it is desired to engage the friction surfaces of the clutch, the operator releases rod 46, which is returned to normal position by means of spring 49, and spring 44 is operative to return push rod 42 and valve member 26 to normal position, whereby valve 29 closes the vacuum connection between the intake manifold and the cylinder. As valve 30 moves from its seat, passage 33a is opened and since this passage is in communication with an air passage 50 (Figs. 2, 3 and 5) air can now flow past valve 30 and through opening 23 into the cylinder, whereupon the clutch spring is effective to return the parts to clutch engaging position.

Novel automatic means are provided for controlling movement of lever 11 from disengaged position to the engaged position shown in Fig. 1, whereby the friction surfaces of the clutch may be brought into engagement in a pre-determined manner such that the torque of the engine will be smoothly transferred, through the clutch, to the driven parts of the vehicle. For this purpose it is desirable that the first portion of the return movement of lever 11 be rapid, and that at the instant prior to and during engagement of the friction surfaces of the clutch, said movement of the lever be retarded. The final portion of the movement of lever 11 to normal position may be rapid.

The variable return movement of piston 15 and lever 11 for securing prompt and yet smooth engagement of the clutch surfaces is obtained by means which comprise an arm 51 (Figs. 1 and 9) pivoted to a suitable lug provided adjacent the upper end of cylinder 14. The upper end of arm 51 is bent inwardly and carries at its extremity a roller 52 adapted to be engaged by a cylindrical cam 53 adjustably carried by a threaded rod 54 which extends through an opening in the upper cylinder head of the power device, said opening being somewhat larger than the greatest diameter of the cam 53 to provide for free passage of air into the upper end of the cylinder. The upper end of rod 54 is secured in any suitable manner to the adjacent end of pin 18, while the lower end of said rod is attached to the upper face of piston 15, so that said rod, cam and piston move in unison.

The lower end of arm 51 (Fig. 2) is adapted to engage a cylindrical valve 55 slidably mounted in a passage 56 formed in the cylinder head portion 25a, said passage being substantially parallel to passages 43 and 24 and connected to the latter by passage 50. A coil spring 57, positioned in passage or bore 56, maintains the valve 55 at all times in engagement with lever arm 51. When the piston is moved downwardly to disengage the clutch, cam 53 passes beneath roller 52 imparting a pivotal movement to arm 51 without varying the operation of the device, since cylinder 14 is at this time closed to atmosphere by valve 30. When, however, the parts move toward clutch engaging position, cam 53 moves upwardly with piston 15 and again engages lever arm 51 just prior to the engagement of the clutch surfaces, whereupon the lower end of said lever arm is effective to move valve 55 to the right, as viewed in Fig. 2, gradually cutting off the flow of air into passage 50 and cylinder 14 through ports 50a and 58 provided in the walls of bore 56. Passage 50 is provided with a branch passage 60 (Figs. 3 and 5) which may be adjustably restricted by means of the bleed valve 59. For a purpose to be hereinafter described, valve 59 may be completely closed so that the clutch surfaces will be arrested upon the closure of ports 50a and 58 by valve 55.

As is seen more clearly in Figs. 2 and 5, the left-hand end of sleeve 33 abuts against a shoulder formed within the walls of passage 24. Closely adjacent this shoulder, sleeve 33 is provided with an annular groove which registers with the adjacent end of passage 50. Openings 33b are formed in the sleeve in the plane of said annular groove and extend radially outward from the inner passage 33a. When valve 55 is in the position illustrated in Figs. 2 and 3, passage 50 is in communication with the atmosphere as indicated, and air is free to flow through connecting passages 33a, 33b, 24 and 23 into the interior of cylinder 14. When valve 55 is moved to the right, however, by the engagement of arm 51 with cam 53, passage 50 is closed to the atmosphere except through the restricted passage 60. Only a small amount of air is thereafter introduced into cylinder 14 through opening 23, with the result that the movement of the piston is effectively retarded and the friction surfaces of the clutch are engaged at a very slow rate of speed, the speed of this movement being dependent upon the adjustment of the bleed valve 59. After cam 53 has passed roller 52 in moving toward normal clutch engaged position, spring 57 returns valve 55 and arm 51 to normal position, whereupon passage 50 and cylinder 14 are again fully opened to atmospheric pressure.

Under certain conditions, as when parking a vehicle, for example, it may be desirable to "slip" the clutch, and under other conditions to speed up the engagement of the clutch, i. e. to render the automatic operation of valve 55 of the device ineffective. The mechanism above described is adapted to facilitate the control of the clutch to meet varying conditions, at the will of the operator. If it is desired to render the automatic control elements ineffective whereby clutch engagement may be speeded up when shifting from second to third gear, for example, the operator depresses rod 46 a short distance during the movement of the clutch friction surfaces toward engaged position. At this time, valve 29 is on its seat, and the vacuum of the engine is effective to resist movement of said valve from closed position. Accordingly, a slight movement of rod 46 is effective to move rod 42, member 38 and barrel 34 to the right, whereby valve 37 is unseated and air passage 41 is opened. Due to the yielding motion transmitting connection 35, 36, this movement of barrel 34 is effected without moving valve 29 from its seat with the result that air flows through passage 41, passage 33a, past valve 30, and through opening 23 into the cylinder, whereby the engaging movement of the clutch surfaces is speeded up, and this regardless of the position of the automatically operated valve 55 and bleed valve 59.

If, after rod 46 has been released and valve 30 has seated, it is desired to "slip" the clutch or to arrest the movement of the same in any desired position, rod 46 is depressed until spring 35 is compressed sufficiently to pull valve 29 off its seat against the pressure of spring 36, which is reduced as barrel 34 moves to the right, and the vacuum pull on the left-hand end of valve member 26. As soon as valve 29 is unseated in this manner, the fluid pressures acting upon the various surfaces of member 26 will be equalized and the latter will move to the right (Fig. 2) to a position at which the force of spring 35 equals that of spring 36. To accomplish this, it is not necessary to depress rod 46 sufficiently far to seat valve 30 as is done when full clutch disengagement is desired. It will be seen, therefore, that power cylinder 14 is thus opened to both atmosphere and vacuum, the mixing valve 26 assuming what may be termed a floating position intermediate the seats for valves 29 and 30. Under this condition, member 26 will move in unison with rod 46 through the medium of springs 35 and 36, the relative movement of the same being determined by the design of cam surface 46a. The operator, therefore, will be enabled, by manual movement of rod 46, to position mixing valve 26 so that the volume of air entering chamber 24 through passage 33a will be just sufficient to decrease the vacuum pull on piston 15 to maintain a substantial balance between such pull and the forces tending to move the clutch surfaces to engaged position, thereby arresting the latter.

To maintain this established balance or equilibrium, it will be noted that the volume of air entering passage 33a must be substantially equal to that being simultaneously withdrawn through passage 27 into the intake manifold. In order to minimize the volume of air which must thus pass by the valves and to increase the ease of control, member 26 in the illustrated embodiment is provided at each end with tapered portions 29a and 30a which extend into and progressively restrict or increase the port areas 27 and 33a respectively, the area of one increasing as the other decreases as a result of the movement of member 26. The degree of taper employed on portions 29a and 30a is such that a comparatively small change in port area is obtained by an appreciable movement of rod 46, thus increasing the fineness of operation. It will be seen that the operator by slight manual adjustments of rod 46 may maintain the clutch surfaces in a stationary position or, by thus increasing or decreasing the port area 33a, he may cause the said surfaces to move toward either engaged or disengaged position, respectively, in the same manner as when manual clutch operation is employed.

The complete engaging movement of the clutch may be controlled through the manual actuation of valve 26 in a manner like that above pointed out for slipping or arresting the same. This is accomplished by releasing rod 46 gradually from depressed position whereupon valve 26 assumes its floating position in chamber 24 and permits the operator to arrest, slip, or reverse the direction of movement of the clutch at will. The clutch may thus be kept under the complete control of the operator when parking or turning in close quarters.

If it is desired to control the rate of engagement of the clutch surfaces in accordance with the pressure in the intake manifold so that such rate will vary directly as the speed with which the accelerator 21a is actuated, it is only necessary to adjust valve 59 (Fig. 3) to closed position. The clutch surfaces are now disengaged in the manner previously described, and when rod 46 is released, said surfaces will move rapidly toward engaged position until cam 53 engages arm 51, whereupon said surfaces will gradually come to rest as valve 55 is moved by said arm to the right, progressively covering ports 50a and 58 to completely cut off the supply of air to cylinder 14. When cylinder 14 is open to atmosphere, valve 29 is held on its seat only by a very slight pressure from spring 36 and by the vacuum pull on the face thereof. As soon as the cylinder is cut off from atmosphere by valve 55, as pointed out above, valve 29 is subjected to a differential pressure, i. e. the difference between the sub-atmospheric pressure in the intake manifold and that in cylinder 14. When accelerator 21a is depressed, the pressure in the intake manifold is increased to a value in excess of that in cylinder 14, whereupon valve member 26 will move to the right to permit air from passage 27 to enter cylinder 14 past valve 29. The clutch surfaces now move into full engagement. It is a well-known fact that the pressure in the intake manifold increases in proportion to the rate at which the accelerator pedal is depressed, and it will be seen, therefore, that the rate of engagement of the clutch surfaces will vary directly as the speed with which the accelerator is depressed. Since in normal operation of a vehicle the accelerator is depressed more quickly when shifting into high gear than when starting in low gear, proper variation in speed of clutch engagement is obtained for all gear ratios. When the clutch surfaces are engaged, cam 53 will have moved from under arm 51, allowing spring 57 to move valve 55 to the left to open ports 50a and 58 to again admit full atmospheric pressure to cylinder 14.

The mechanism of the present invention is so constructed that in the event that the power means fails, the driver may manually disengage the clutch. For this purpose rod 46 carries a loose sleeve 61 provided at its lower end with a flange 62 adapted to engage inwardly extending flanges 63 of a bifurcated lever 65 that is pivoted to bracket 17 as at 66. The outer ends 64 of lever 65 are adapted to engage roller 18 on the opposite side from lever 11. Rod 46 also carries a rigidly attached sleeve 67, the lower end of which is normally spaced from the upper end of loose sleeve 61 whereby rod 46 may be actuated to provide for power operation of the clutch without manually operating the clutch. If the power means fails, however, the operator depresses rod 46 a sufficient distance to move sleeve 67 into engagement with sleeve 61. Further downward movement of rod 46 is effective through flange 62 and ears 63 to swing the arm 64 in a clockwise direction whereby lever 11 is moved about its pivot in an anti-clockwise direction and the friction surfaces of the clutch are disengaged. In spite of the failure of power or the desire of the driver to cut out the automatic disengagement, as is desired under some circumstances, the control means heretofore described is now operative to automatically retard the clutch surfaces just prior to and during the engagement of the same. Smooth and proper clutch engagement is thus insured even when one resorts to manual operation of the clutch.

Spring 72, during normal operation of the power means, yieldingly holds lever 65 in the position illustrated in Fig. 1 during operation of the power means.

An additional control which operates in accordance with the engine speed may be provided for valve member 26, either alone or in combination with the manual control means heretofore described. As shown in Fig. 2, U-shaped member 38 is secured as by means of a screw 70 to the armature 69 of a solenoid 68 which is operatively connected by means of leads 71 to the generator, or battery, of the vehicle and to a switch (not shown) positioned at any suitable point within easy access of the driver, as on top of the gear shift lever, or the same may be operatively connected to the accelerator pedal. The switch may thus be manually operated to control the declutching and clutching operation, instead of rod 46.

In Fig. 9, there is illustrated another embodiment of the invention wherein the power unit of Fig. 1 is operatively connected to a clutch pedal 73 by means of a flexible connection 74. One end of the connection is secured in any suitable manner to piston rod 16 while the opposite end of said connection is pinned to a strap 75 which surrounds clutch pedal 73 at a convenient point. The unit is so mounted beneath the floor boards that rod 46 projects therethrough in a position at one side of and closely adjacent the clutch pedal 73. When power operation of the clutch is desired, the operator depresses rod 46 in a manner previously described whereupon the force of the power unit is transmitted through connection 74 to the clutch pedal 73 to disengage the friction surfaces of the clutch against the action of the clutch spring 76. When rod 46 is released, the clutch lever 73 and hence the friction surfaces of the clutch are returned to engaged position in the manner previously described in connection with Fig. 1. The arrangement shown in Fig. 9 is adapted for ready installation as an accessory and eliminates the necessity for the type of clutch lever shown in Fig. 1. It also eliminates the necessity for the bifurcated lever 65 and its associated elements, the function of the latter being performed in the usual manner by clutch pedal 73.

The embodiment of the invention illustrated in Fig. 10 is quite similar to that shown in Fig. 9 but differs therefrom in that the clutch pedal 73 is connected to piston rod 16 by means of a rigid rod 80. Preferably, a ball and socket connection 81 forms the connecting means between rod 80 and piston rod 16. By this arrangement the retarding means constituted by the power unit, lever 51 and cam 53, are effective to impart a variable movement to the clutch surfaces as the latter move to engaged position. If desired, a ball check valve 82 may be provided for piston 15 to insure that the operator will not have to work against compression within cylinder 14 during manual operation of pedal 73.

There is thus provided novel clutch mechanism adapted for power or manual operation. In one embodiment of the invention, a single member is employed for initiating operation of the power unit and, in the event that the latter fails to function, said member may be actuated manually to operate the clutch in the usual manner. The mechanism is so constructed as to insure prompt and smooth engagement of the friction surfaces of the clutch, thereby eliminating the care and skill usually required on the part of an operator. Unusual flexibility is provided for in that the clutch can be "slipped," the movement of the clutch elements into engagement may be arrested, reversed or speeded up, thereby rendering the automatic engaging means ineffective, and, finally, the speed of engagement of the friction surfaces of the clutch may be varied in accordance with the changes in pressure in the intake manifold. As will be understood by those skilled in the art, if power operation of the clutch is not desired, automatic control of the engaging movement of the friction surfaces of the clutch may still be maintained.

The mixing valve 26 is associated with means for securing two-stage movement of the clutch surfaces to engaged position. When valve 29 is moved a short distance from its seat, additional air will bleed past valve 37 to supplement the air flowing past bleed valve 59, whereby the second stage of the movement may be speeded up, if desired. Under certain conditions, manually operable valve 26 may be power operated by the difference in pressures on the opposite sides thereof, or said valve may be operated by the power means 69.

Various changes may be made in the details of construction and in the arrangement of parts, and reference will accordingly be had to the appended claims for a definition of the limits of the invention.

What is claimed is:

1. Apparatus of the character described comprising a power device connected to an operating member of a motor vehicle clutch having a normal bias to operative position, a control device for rendering the power device operative to move the clutch elements to inoperative position and releasable to permit the clutch elements to return to normal position, and automatic means rendered operative as the elements of the clutch approach operative position for retarding the movement of such elements, said control device including an element controllable to render said automatic means substantially ineffective for retarding the clutch elements.

2. The combination with a motor vehicle clutch and an operating member therefor, of a power device connected to said operating member and operable for disengaging the clutch, a control device movable from normal position for rendering said power device operative, and automatic means operative as the elements of the clutch approach operative position for retarding the movement of such elements, said control device including means for rendering said automatic means substantially ineffective for retarding the clutch elements.

3. The combination with a motor vehicle clutch having a normal bias to operative position and an operating member therefor, of a power device connected to the operating member, a control device for rendering the power device operative to move the clutch elements to inoperative position and releasable to permit the clutch elements to return to normal position, and automatic means rendered operative as the elements of the clutch reach approximately the point of initial engagement for checking the movement of such elements, said control device including an element controllable to render said automatic means substantially ineffective for checking the movement of the clutch elements.

4. The combination with a motor vehicle clutch having a normal bias to operative position, of a power device including a chamber having a member therein operative by differential pressure and connected to the clutch, valve mechanism normally operative for establishing pressure equalization in said power device and operable for establishing pressure differential therein, and an automatic valve operative in conjunction with said valve mechanism for checking the movement of the clutch elements as they reach approximately the point of initial engagement, said valve mechanism being subject to control independently of said automatic valve for rendering the latter ineffective for substantially retarding the movement of the clutch elements.

5. Apparatus of the character described comprising a power device including a chamber having a member therein operative by differential pressure and connected to a motor vehicle clutch having a normal bias to operative position, valve mechanism normally operative for establishing pressure equalization in said power device and operable for establishing pressure differential therein, and an automatic valve operative in conjunction with said valve mechanism for checking the movement of the clutch elements as they reach approximately the point of initial engagement, said valve mechanism being subject to control independently of said automatic valve for rendering the latter ineffective for substantially retarding the movement of the clutch elements.

6. Apparatus of the class described comprising a power device connected to an operating member of a motor vehicle clutch, control means including a floating valve for rendering said power device operative to move the clutch surfaces to inoperative position and for releasing the clutch surfaces for movement toward operative position, means operative as the clutch surfaces approach engaged position for retarding the movement of said surfaces, and manual means for moving said clutch surfaces to inoperative position, said retarding means being operative independently of whether the clutch surfaces are moved to inoperative position by said power device or by said manual means.

7. Apparatus of the class described comprising a power device connected to an operating member of a motor vehicle clutch, control means including a manually operable member and a floating valve adapted for movement relative to said manually operable member, said control means being adapted to render the power device operative to move the clutch surfaces to disengaged position and for releasing the clutch surfaces for movement toward operative position, and means for varying the rate of movement of the clutch surfaces as they approach operative position, said control means being adapted to render the last-named means ineffective.

8. In a pneumatic apparatus for actuating the clutch lever of a motor car, the combination with such clutch lever of a cylinder having a closed end, a piston in said cylinder having a piston rod extending through an end of said cylinder and connected to said lever, a conduit connected to the interior of the closed end of said cylinder, and a valve apparatus controlling passage through said conduit comprising a valve casing to which such conduit is connected, and a valve member having a sliding fit in said casing and also having a relatively considerable portion of its length of a slightly tapering cross-section adapted to cooperate with a port in said casing during a portion of its travel whereby the flow of air from said closed end of the cylinder may be regulated by adjustment of such valve member with reference to said port.

9. In apparatus of the class described, a friction clutch, a lever for moving the friction surfaces of said clutch to disengaged position, said lever being adapted for manual operation, means for moving said lever from disengaged position to engaged position, and means for controlling movement of the lever toward clutch engaged position whereby said lever has rapid movement prior to engagement of the friction surfaces of the clutch and a substantially retarded movement immediately prior to and during engagement of said friction surfaces, said last named means including valve means controlled in accordance with the movement of said lever and means for rendering said control means ineffective during clutch disengaging movement of said lever.

10. In apparatus of the class described, a fluid pressure operated device, differential pressure valve means for controlling said device, and manual means connected to the valve means for rendering the pressure control of the first-named means ineffective.

11. In apparatus of the class described, a friction clutch, a lever for moving the friction surfaces of said clutch to disengaged position, means operatively connected to the lever for holding the friction surfaces of the clutch in engagement and for moving the lever from disengaged position to engaged position, fluid pressure means for variably controlling movement of the lever towards clutch engaged position including a fluid pressure cylinder, a piston therein, and movable air control means operatively connected to said piston, and means for rendering said control means ineffective during clutch disengaging movement of said lever.

12. The combination in a motor vehicle of a clutch, means for normally holding said clutch in engaged position, manually operable means for disengaging said clutch, means for controlling the speed of engagement of said clutch by said first-named means including a member movable with said manually operable means, and valve means controlled in accordance with the position of said member, and means for rendering said control means ineffective during disengaging movement of the clutch.

13. In apparatus of the class described, a fluid pressure device having a movable member, means for moving said member in one direction, and means for controlling said device comprising a mixing valve and means controlled by said member for subjecting the latter to an irregular movement.

14. In an automotive vehicle provided with a clutch, a pressure differential operated motor for actuating said clutch, and valve means for controlling said motor including a power operated valve for initiating the clutch disengaging and engaging operations of the motor, and independently operable manual means for actuating said power actuated valve.

CHARLES A. BREWER.